March 4, 1958 R. J. MARMORSTONE 2,825,894
CONTROL AND ANNUNCIATOR SYSTEMS
Filed May 3, 1956 2 Sheets-Sheet 1

INVENTOR.
Robert J. Marmorstone
By: Wallenstein & Spangenberg attys

United States Patent Office 2,825,894
Patented Mar. 4, 1958

2,825,894

CONTROL AND ANNUNCIATOR SYSTEMS

Robert J. Marmorstone, Chicago, Ill., assignor to Panellit Inc., Skokie, Ill., a corporation of Illinois Application May 3, 1956, Serial No. 582,398

10 Claims. (Cl. 340—213)

This invention relates to an improved control and annunciator system which continuously monitors a large number of variables and which gives an indication of the variables which have reached an adjustable pre-alarm limit.

There are many applications requiring the monitoring of an exceedingly large number of variables, for example, a thousand or more variables. Alarm monitoring or alarm detecting systems for such complex applications are expensive installations. It can be well appreciated that a diminution in the cost of a basic component or circuit which is multiplied hundreds or thousands of times in such a system can amount to a considerable saving of money which can well mean the difference between the gain or loss of a sale involving hundreds of thousands of dollars; and this is particularly so in the highly competitive market of the present day.

It is desirable that these alarm detecting systems provide substantially continuous monitoring of the variables. Usually, information on alarm or abnormal conditions of all the variables are presented in the form of light indications on a large panel viewable by a single operator. Often it is desirable to additionally display information on the closeness of the variables to a limiting alarm condition which would require shutdown of a system for safety purposes. Such a forewarning may prevent the necessity for shut-down if the near abnormal variables involved can be varied or otherwise controlled. Where the continuous monitoring for near-alarm conditions in addition to an alarm condition is required, each variable may have associated with it separate detecting circuits or units adjusted to detect the near-alarm and alarm conditions. These detecting units usually require sensitive and therefore relatively expensive components so that the addition of the function of monitoring for near-alarm variables using completely separate detecting circuits requiring a doubling of the number of components used would result in considerable increase in cost. A possible solution to this problem would be to utilize a single additional detecting unit and then sequentially connecting this additional detecting unit to all of the test points. Because of the large number of connections in a scanning system required for this purpose, this solution is expensive also. Another disadvantage of the scanning system is the fact that there is an appreciable time lapse between the monitoring of any particular variable so that continuous monitoring is not obtained.

The type of annunciator system with which the present invention deals, preferably continuously monitors both near-alarm and alarm conditions of the variables using common circuit elements in the circuits which monitor the alarm and near-alarm conditions to minimize the cost of the basic detecting unit. As soon as a variable reaches a selected near-alarm condition, a pre-alarm light is turned on. When the variable reaches or exceeds a selected alarm level, then an alarm light is turned on. The pre-alarm and alarm lights are preferably mounted at a single location so that an operator may quickly survey the conditions of all of the variables involved. A single control may be provided for adjusting the pre-alarm level of all variables. By noting the energized pre-alarm lights, the operator is able to immediately determine which variables have reached or exceeded the selected pre-alarm level.

It is one of the objects of the present invention to provide an annunciator system wherein an automatic reset feature is provided so that the near-alarm lights will respond to any change in the aforementioned common near-alarm control without requiring any manual resetting operation. In this new system, the operator may quickly and easily obtain information on variables falling within different near-alarm ranges by gradually varying the aforementioned near-alarm control and watching for changes in any of the alarm lights. This procedure was not readily possible or practical with systems heretofore proposed.

It is another object of the present invention to provide an annunciator system of the type generally described above which is more sensitive and more reliable in operation than similar systems heretofore proposed. An ancillary object of the present invention is to provide an annunciator system of the aforementioned type wherein the individual detecting circuits are at all times conditioned for alarm operation, and wherein means responsive to the condition of the detecting circuits are provided which control the near-alarm lights and provide an adjustable control over the near-alarm levels without interfering in any way with the alarm operation of the detecting circuits.

Still another object of the present invention is to provide an annunciator system of the type above described which is of a substantially more simple and economical construction than systems of a similar type heretofore proposed.

One aspect of the invention includes the provision of a pre-alarm detecting circuit controlled by the output voltage or current of the alarm detecting circuit. The pre-alarm detecting circuit preferably includes a differential or balancing circuit which is responsive both to the output of the alarm detecting circuit as well as to a current or voltage applied thereto externally of the alarm detecting circuit. Whenever the voltage or current controlled by the alarm detecting circuit and the externally controlled voltage or current reach a pre-determined differential value indicating that a pre-alarm range has been reached, an associated pre-alarm light is energized. By varying the externally controlled current or voltage, the pre-alarm range may be varied. With this differential or balancing circuit, the alarm detecting circuit is isolated from the pre-alarm detecting circuit and the alarm detecting circuit is a more simple and reliable circuit as compared to a circuit where isolation between the two detecting circuits is not present.

Before proceeding with a further description of the invention, it will be helpful to review the operation of one form of detecting circuit which is usable with the present invention. Where, for example, a Wheatstone bridge circuit is utilized, one of the arms of the bridge may include a variable resistance transducer element, such as a resistance thermometer, whose resistance is a function of the variable being monitored. In series with the transducer element is a calibrated alarm-setting variable resistance. A sensitive relay or other similar sensing element is positioned across the output terminals of the bridge and is adapted to be actuated by a certain minimum voltage or current level. Varying the aforementioned alarm-setting resistance varies the value of the variable which will provide this minimum voltage level. If the transducer is a linear element over the expected range of operation thereof, then for a variable having a value any given number of units from any selected alarm value, the same voltage will appear at the output of the bridge circuit irrespective of the selected alarm value. However, if the transducer element is non-linear, this will not be true. This presents problems in an annunciator system where the alarm detecting circuit, in this case the Wheatstone bridge circuit, is used to operate a pre-alarm detecting circuit associated therewith. These problems are overcome by the present invention.

Where the transducer elements are linear in operation, each of the pre-alarm detecting circuits can be controlled directly by a common voltage source since the output voltage of the bridge circuits will be the same for the same differential values between the values of the variables and the selected alarm limits thereof. Where, however, the transducers are non-linear, a compensating resistance is placed in circuit between the common adjustable voltage source and each pre-alarm detecting circuit. This compensating resistance is ganged for operation with the associated alarm-setting resistance so that the same differential current conditions exist for the same pre-alarm conditions, even though the alarm limits, and hence, the bridge circuit outputs may be different.

The differential circuits each preferably include a magnetic amplifier. A magnetic amplifier has a saturable core around which are a number of signal or control and output windings. In the present invention, the magnetic amplifier is provided with two control windings, one of the windings being connected across the output of the alarm detecting circuit and the other winding being connected in the pre-alarm detecting circuit. The alarm detecting circuit is fed from a direct current source so that the current flowing in the output thereof is likewise a direct current which is a measure of the nearness of the associated variable to the selected alarm value. The pre-alarm detecting circuit also is fed from a direct current source and the amount of direct current flowing through the second mentioned control winding is a function of the desired pre-alarm value. The two control windings are connected in bucking relationship so that the flux produced by the two windings oppose one another in the core. The output winding of the magnetic amplifier is in one form of the invention connected in series with a pre-alarm light control relay and this circuit is fed from a source of alternating current. The average permeability of the core is a function of the resultant or differential direct current ampere turns of the two control windings. The smaller the resultant ampere turns the lower is the saturation of the core and the higher is the permeability of the core and the lower is the A. C. current in the output winding. The circuits associated with the control windings and the number of turns thereof are preferably arranged so that a permeability of the core will rise above a given pre-determined value for a given differential current flow in the control windings when the pre-set pre-alarm level has been reached. By varying the flow of current in the pre-alarm detecting circuit, the value of the variable producing the aforementioned differential current in the magnetic amplifier control windings will vary thus varying the value of the variable which will operate the pre-alarm light control relay in the circuit of the output winding. The relay is set to trip when the current flow therein reaches the value indicating that the pre-alarm limit has been reached.

Although the magnetic amplifier is preferred, a differential or balancing relay may be substituted for the magnetic amplifier. A balancing relay has a pair of differentially connected windings respectively connected across the output of the bridge or other alarm detecting circuit and in the pre-alarm detecting circuit so that the direct current flowing through the windings produces opposing fluxes. When the differential current flowing through the windings reaches a given predetermined value, contacts of the relay trip to energize the associated pre-alarm light.

With the systems above described, the pre-alarm detecting circuit has no effect upon the operation of the alarm detecting circuit although it is responsive to the current flow therein in the manner explained. Also, as soon as the variable falls below the pre-set alarm level, the alarm light is automatically reset to its de-energized state. By utilizing a single control calibrated in differential units defining different pre-alarm ranges for adjusting the aforementioned common adjustable voltage source which feeds the pre-alarm detecting circuits associated with all variables, the pre-alarm limit for all the variables can be progressively and simultaneously controlled, and the automatic resetting feature of the alarm-lights enables the operator to quickly and easily obtain information on which variables fall within different pre-alarm ranges.

Other objects, advantages and features of the invention will become apparent upon making reference to the specification, the claims and drawings wherein:

Fig. 1a shows a modified magnetic amplifier circuit useable with the embodiment of Fig. 1; and Fig. 2 shows an alarm detecting system designed in accordance with the present invention which utilizes a differential or balancing relay in place of the magnetic amplifier in the embodiments of Figs. 1 and 1a.

Figure 1:
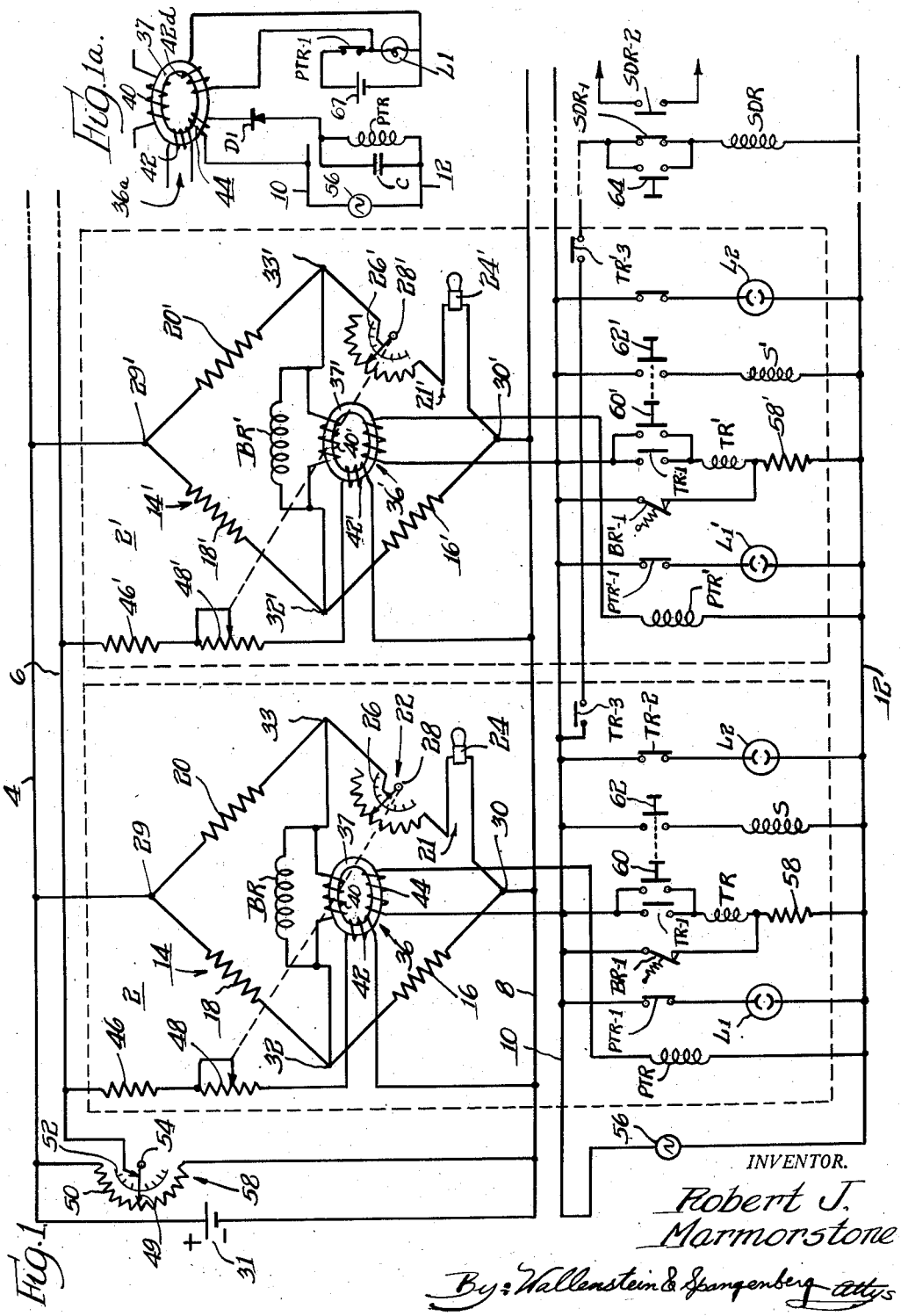
Fig. 1 is a schematic diagram of an alarm detecting system designed in accordance with the preferred form of the invention in that it utilizes a magnetic amplifier as the differential current-responsive device.

Referring now to the embodiment shown in Fig. 1, the various elements except for the common buses enclosed in dotted lines and referred to by the reference numerals 2, 2', etc., form a control and annunciator circuit exclusive to the respective variables, which in the present case will be assumed to be temperature variables, although other kinds of variables may obviously be involved. The circuitry located within the dotted lines are identical, and are connected in parallel between direct current buses 4, 6, and 8, and alternating current buses 10 and 12, in a manner to be fully explained hereafter. Although not shown, a typical system may consist of hundreds of such annunciator circuits 2, 2' connected across these buses for monitoring the large number of variables.

Each annunciator circuit 2, 2', etc., includes a sensitive detecting unit such as 14, 14', etc., which in the drawing is illustrated as a Wheatstone type of bridge circuit, although it should be understood that other types of detecting circuits can be utilized without departing from the spirit of the broader aspects of the invention. Since all of the annunciator circuits 2, 2', etc. are alike, only one will be described in detail. The bridge circuit 14 has resistance arms 16, 18, and 20, and an arm 21 including a calibrated alarm limit setting variable resistance or rheostat 22 in series with a resistance thermometer or thermistor 24. Obviously, if variables other than temperature are involved, the variable resistance element 24 will be replaced by a suitable variable resistance transducer whose resistance varies as a function of the value of the variable involved. The alarm limit setting variable resistance 22 has a scale 26 calibrated in temperature units, and an adjusting knob 28 for setting the resistance to a temperature which represents the limiting, or what will be referred to as an alarm temperature requiring shut-down of the system being monitored. It will be assumed in the exemplary forms of the invention being described that the variables being monitored are variables of one overall system or process where the alarm condition of any variable will require shut-down of the system. The invention, however, has broader application. The input terminals 29 and 30 of the bridge circuit are respectively located at the junction points of resistance arms 18 and 20 on the one hand and 16 and 21 on the other hand. The terminals 29 and 30 are respectively connected to direct current buses 4 and 8 which are in common with all annunciator circuits. The direct current buses 4 and 8 are fed from a source of regulated direct current voltage 31.

The output terminals 32 and 33 of the bridge circuit are respectively located at the junction between resistance arms 16 and 18 on the one hand and resistance arms 20 and 21 on the other hand. The alarm and pre-alarm sensing elements are associated with a branch 34 connected between the output terminals 32 and 33 of the bridge circuit. Located in this branch is a sensitive relay BR which control contacts BR–1 in a circuit to be described which controls the operation of an alarm light L–2 and a shut-down circuit for shutting down the system being monitored.

Connected in parallel with the sensitive alarm relay BR is a magnetic amplifier generally indicated by the reference numeral 36. The magnetic amplifier and associated circuitry controls the operation of a pre-alarm light L–1. In a description to follow, the description of the circuitry associated with the magnetic amplifier 36 will first be described following which the circuitry associated with the sensitive alarm relay BR will be described. Also, in the paragraphs to follow, the contacts of a particular relay are referred to by utilizing the same reference characters as the relay with the addition of a number representing the particular set of contacts of the relay involved. Additionally, the relay contacts in the drawings are shown in their positions when their control relays are deenergized, although many of the relays to be described are normally energized during quiescent operation of the system to provide a fail-safe system. Thus, the opening of a relay circuit will operate an annunciator light, such as L–1 or L–2, to alert an operator to trouble.

The magnetic amplifier 36 has a saturable core 37 around which is wound a first signal or control winding 40, a second signal or control winding 42 and an output winding 44. The magnetic amplifier may include additional circuits, such as feed-back circuits not shown, which increase the sensitivity and response thereof in a well known manner. A simplified circuit is shown in the drawings. The windings 40 and 42 are connected so that the direct currents which flow therethrough will produce opposing or bucking fluxes in the core 37. The first control winding 40 is connected in parallel with the sensitive alarm relay BR, and the current flowing thereto is accordingly a measure of a degree of unbalance of the bridge circuit which in turn is a measure of the number of units, in this case degrees, the variable is from the alarm value whatever that may be. As previously stated, the alarm value is determined by the setting of the variable resistance 22. If the variable-responsive element 24 is a linear device, the voltage across the output terminals 32 and 33 when the associated variable reaches any alarm limit would be the same irrespective of what the alarm limit is because the sum of the resistance of the element 24 in the variable resistance 22 will always be the same for the alarm condition. The same holds true in such case when the variable reaches any given number of units from its pre-set alarm value whatever that may be. However, if the variable-responsive element 24 is non-linear in the range of operation involved, then this will not be true. This non-linearity does not affect alarm operation of the system since the calibration of the variable resistance 22 can be made to compensate for the non-linearity. In such cases, however, the voltage output across the bridge circuit would not be the same when the variable reached a given number of units from the alarm value for different alarm settings. Means for compensating for non-linear operation of the variable-responsive element 24 for pre-alarm operation will be described hereafter.

The second control winding 42 is associated with a circuit extending from a common direct current bus 6 and through a current limiting resistor 46, the compensating variable resistance or rheostat 48 which is ganged for operation with the alarm setting rheostat 22, and the second control winding 42 leading to the common direct current bus 8.

The direct current bus 6 is connected to the wiper 49 of a pre-alarm setting potentiometer 50 which is connected across the direct current buses 4 and 8. Potentiometer 50 has a scale 52 calibrated in terms of differential temperature units, that is, in units difference between the selected pre-alarm value of the variables and the alarm limits set therefor for the various alarm limit setting rheostats 22, 22' etc. A knob 54 is provided for varying the position of the potentiometer wiper 49 which in turn varies the direct current voltage on the common bus 6 which feeds the pre-alarm detecting circuits. Variation of the voltage on this bus, of course, varies the direct current flowing through the various control windings 42, 42', etc.

The output winding 44 of the magnetic amplifier is connected in a circuit extending from a common bus 10 connected to one terminal of a source of alternating voltage 56. In this circuit, the output winding 44 is connected in series with a pre-alarm relay PTR connected to a common bus 12 leading to the terminal of the alternating current voltage source 56. The latter relay for reasons to be explained is a normally energized relay having contacts PTR–1 in a circuit extending from the bus 10 which contacts are in series with the pre-alarm lamp L–1 leading to the other common bus 12. The latter contacts close to energize the lamp L–1 when the relay PTR becomes de-energized when the pre-alarm limit is reached.

In explaining the operation of the magnetic amplifier, let it first be assumed that the temperature-responsive element 24 is linear and that as the temperature increases from a value below the pre-alarm limit set by the potentiometer 50, the direct current flowing in the first control winding 40 of the magnetic amplifier decreases. The ampere turns in the second control winding 42 are made appreciably less than the reverse ampere turns of the first control winding 40 as long as the variable is below the pre-alarm limit so that the core 37 is saturated. This means that the impedance of the output winding 44 is relatively low creating a large A. C. current through the PTR relay. When the variable reaches the pre-alarm limit, the current in the first control winding 40 drops to a point where the ampere turns of the winding 40 are substantially equal and opposite to the ampere turns of the winding 42 whereupon the core becomes unsaturated, increasing the impedance of the output winding 44 substantially to drop the current through the relay PTR to where the relay actuates or effectively reaches a relative de-energized state which results in the closing of the contacts PTR–1. This energizes the pre-alarm light L–1.

By adjusting the pre-alarm setting potentiometer 50 to provide a higher voltage on the bus 6, the current in the second control winding 42 increases so that the balanced condition between the windings 40 and 42 is reached at a lower value of the variable, so that the number of units between the pre-alarm level and the alarm level is increased. Conversely, a decrease in the voltage applied to the bus 6 will increase the value of the variable which will create a balanced condition of the ampere turns in the windings 40 and 42 and hence will decrease the number of units between the pre-alarm level and the alarm level. As previously stated, the potentiometer 50 is calibrated in differential temperature units and not in terms of an actual pre-alarm temperature value 5. Potentiometer 50 may therefore be used to control the pre-alarm range of all variables, even though the particular alarm limits for the various variables are different.

As explained above, if the variable-responsive elements 24, 24', etc., are non-linear, then the output voltages of the various bridge circuits will not be the same for different alarm limit settings for a given differential value between the actual value of the variables and the alarm limits thereof. A common control for adjusting the pre-alarm limits could not in such case be used unless some means for compensating for the non-linearity of the temperature-responsive elements is provided. This compensating means are the variable resistances 48, 48′ in the pre-alarm detecting circuits. Each of these resistors is ganged for operation with the associated alarm setting potentiometer and may be non-linearly wound to provide for operation of the pre-alarm detecting circuits when the pre-alarm limits have been reached.

As previously stated, when the value of the variable associated with any detecting circuit reaches an alarm value as determined by the setting of the rheostat 22, 22′, etc., the current in the sensitive alarm relay BR will drop to a value which actuates the relay. This relay has contacts BR–1 in a circuit associated with an alarm relay TR. The alarm relay is in a normally energized circuit extending from the A. C. bus 10 and through normally-open but then closed holding contacts TR–1, the coil of the alarm relay TR and through a current limiting resistance 58 leading to the other bus 12. The sensitive relay contacts BR–1 are connected in parallel with the alarm relay TR so that the closing of the normally-closed contacts BR–1 will result in the de-energization of the alarm relay TR. The alarm relay TR has contacts TR–2 in a circuit extending from the bus 10 and including the latter contacts and the alarm lamp L–2 leading to the other bus 12. Since the contacts TR–2 are normally closed contacts, de-energization of the relay TR will result in the energization of the lamp L–2 indicating that an alarm condition has been reached.

The magnetic amplifier may include additional load windings to provide additional stability and sensitivity in a well-known manner.

The pre-alarm operation of the system provides for automatic reset or de-energization of the pre-alarm light L–1 when the temperature or other variable drops below or out of the pre-alarm range involved. By progressively varying the pre-alarm control 50 from a point where the pre-alarm range is practically zero, the operator can quickly and easily determine the nearness to the alarm condition of the variables by watching which lights come on at different stages of adjustment of the control.

Manual reset for the alarm light indications, however, is provided. When the alarm relay TR was previously de-energized, its energization circuit including the contacts TR–1 opened, and this condition prevails until a reset push button 60 is closed to momentarily shunt the contacts TR–1 which energizes the relay TR if the associated variable is no longer at the alarm level.

Another reset push button control 62 ganged for operation with the reset control 60 is provided in a circuit extending from the A. C. bus 10 and through the normally-open push button contact 62 and through a solenoid S leading to the other bus 12. The armature of the solenoid S when the solenoid is energized kicks the rather sensitive movable contacts BR–1 of the sensitive relay BR to its open position. In some cases, the contacts of the sensitive relay stick in their closed position when the condition of the relay is such that the contacts should open. The reset solenoid S prevents such sticking.

As the alarm relay TR is actuated, contacts TR–3 are closed. The latter contacts are in a circuit extending from the common A. C. bus 10 and through a series circuit including the normally-closed contacts TR–3, TR–3′, etc. associated with the various annunciator circuits. These contacts in turn are in series with normally-closed holding contacts SDR–1 of a shut-down relay SDR leading to the other common bus 12. Thus, opening of any of the contacts TR–3, TR–3′, etc. will de-energize the relay SDR. The latter relay has normally closed contacts SDR–2 in a circuit (not shown) which open to de-energize a control circuit for the equipment or system being monitored. The resetting of the shut-down circuit is effected by a push button 64 which when momentarily depressed re-energizes the relay SDR.

In the circuit just described, the pre-trip relay was an alternating current relay. It may be desirable to utilize a direct current relay since such a relay usually has a more controllable pull-in and drop-out point than an alternating current relay. This is important when the voltage at which the relay pulls-in is different from the voltage across the relay when the relay drops-out. This difference in the pull-in and drop-out voltage is usually due to the change in impedance of the relay coil brought about by the change in reluctance in the core of the relay as the armature moves from its contact-closing to its contact-opening position.

Refer now to Fig. 1a which shows a modification of a part of the circuit of Fig. 1. In the modified circuit of Fig. 1a, a direct current pre-trip relay is utilized which has different pull-in and drop-out voltages. Means are provided in this modified circuit for compensating for this condition so that the relay will pull-in and drop-out at the same pre-trip voltage in the output of the bridge circuit. This compensating means includes an additional control winding 42d on the core of the magnetic amplifier.

Before describing the circuit associated with the additional control winding, the circuit associated with the pre-trip relay will be described. This circuit extends from the A. C. line 10 and passes through the output winding 44 which is connected in circuit with a diode rectifier D1 and the coil of the pre-trip relay leading to the other A. C. line 12. A capacitor is connected across the latter relay. Thus, current will only flow through the relay pre-trip relay in one direction. During the half cycle where current does not flow through the diode rectifier D1, the relay PTR is fed with current from the capacitor C. The average value of the current flowing through the relay PTR is still a function of the degree of saturation of the core 37 and the relay will reach a condition where it operates to indicate that a pre-alarm limit has been reached in the same manner described in connection with the embodiment of Fig. 1. When the current in this relay drops below the pre-trip indicating value, the contacts PTR–1 thereof will close to energize the lamp L–1.

In the modified circuit of Fig. 1a, the lamp L–1 is associated with a source of direct current rather than a source of alternating current as in the embodiment of Fig. 1. Connected in parallel with the lamp L–1 is the compensating control winding 42D. This winding will thus be fed with direct current during pre-alarm operation. The number of turns and the value of direct current flowing in the compensating control winding 42D is such that the flux condition in the core 37 will result in the return of the relay PTR to its normally energized condition indicating a variable value outside of the pre-alarm range when the voltage at the output of the bridge circuit exceeds by a very small amount the pre-trip indicating value. The actual average voltage opening across the relay PTR in this case will still be the drop-out voltage of the relay. Thus, although the pull-in and drop-out voltages of the relay PTR may be appreciably different, the relay PTR will pull-in or drop-out at approximately the same bridge output voltage.

Figure 2:
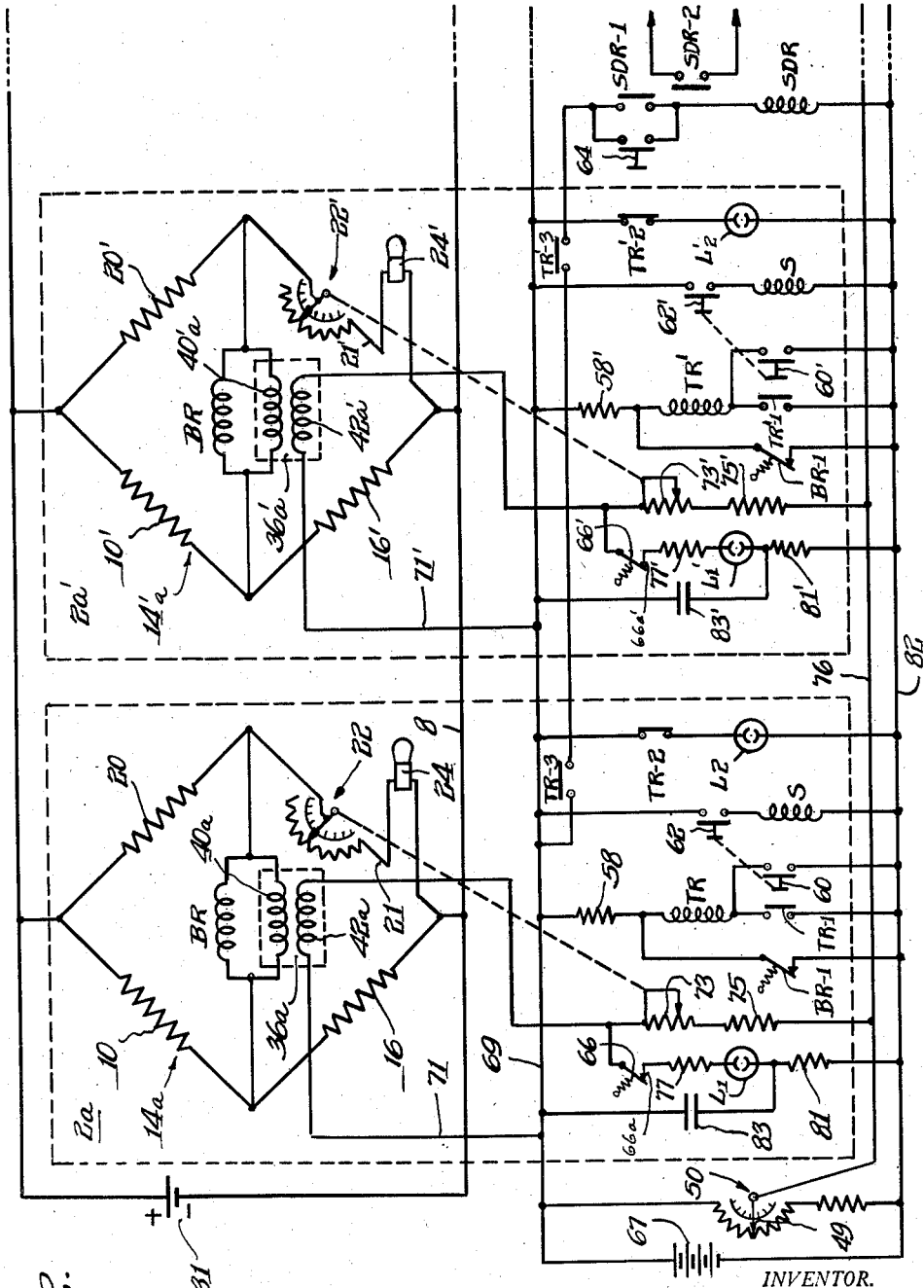

Refer now to the embodiment shown in Fig. 2 which utilizes instead of a magnetic amplifier a differential or balancing relay 36a in the pre-alarm detecting circuit. The alarm detecting circuit 14a, 14a′, etc. and the associated alarm relay circuits are similar to the bridge and alarm relay circuit just described, and corresponding elements thereof have been similarly numbered. One of the minor differences between the circuit of Fig. 2 from that described in Fig. 1 is the fact that in the circuit of Fig. 2 the relays which control operation of the pre-alarm and alarm lights L–1 and L–2 are controlled from a direct current voltage source rather than from an A. C. current source.

The differential or balancing relay 36a has a control winding 40a connected in parallel with the sensitive relay BR and another control winding 42a which is connected directly into the pre-alarm circuit to be described. The differential relay 36a is constructed like a sensitive D'Arsonval movement wherein an armature is mounted for rotation between the poles of a magnet. The armature contains the windings 40a and 42a and a contact 66. The windings 40a and 42a are connected into the circuit so that the current flowing therethrough produces opposing fluxes and when the fluxes are in a balanced or near balanced condition the contact 66 connected to the armature makes contact with a stationary contact 66a.

The energization circuit for the control winding 42a can be traced from the positive terminal of a source of direct current voltage 67 leading to a common bus 69. Branch circuit 71, 71', etc. extends from the common bus 69 to the various annunciator circuits. Branch 71 includes the winding 42a of the differential relay in series with a compensating variable resistance or rheostat 73 and a current limiting resistance 75 extending to a common bus 76 leading to the wiper 49 of the pre-alarm setting potentiometer 50. The latter is connected across the source of direct current voltage 67. By varying the potentiometer 50, the voltage on the common bus line 76 is accordingly varied to adjust the pre-alarm level by varying the bias current flowing through the differential relay winding 42a. The compensating resistance 73 is ganged for operation with the alarm-setting rheostat 22 to compensate for non-linearity in the operation of the variable responsive element 24 in a manner similar to that described in connection with the embodiment of Fig. 1.

The circuit in which the contacts 66—66a of the differential relay is associated can be traced from the common bus 69, and through part of the branch 71 including differential relay winding 42a, contacts 66—66a, resistance 77, pre-alarm neon light L–1, and resistance 81 leading to the other common bus 82 connecting with the negative terminal of the voltage source 67. A capacitor 83 extends from the positive bus 69 to the junction between the pre-alarm light L–1 and the resistance 81. The capacitor in conjunction with the neon light L–1 and resistance above mentioned forms a relaxation oscillator-type circuit which periodically extinguishes the neon light L–1 when the variable is in the pre-alarm range. When the variable is below this limit, contacts 66—66a are open and the capacitor 83 charges up to the voltage appearing across the buses 69 and 82. When the pre-alarm range is reached and the ampere turns of the windings 40a and 42a balance, the contact 66 is pulled into a position where it almost makes contact with the stationary contact against the force of a restraining spring. The inertia of movement of the contact actually carries it into contact with stationary contact where it is held by forces set up by current flowing between the contacts 66—66a. Initially, the voltage stored in the capacitor is sufficiently high to operate the neon lamp L–1 which is coupled to the capacitor through the contacts 66—66a. The capacitor then discharges until the voltage drops to a point where the neon light is extinguished. This breaks the circuit which includes the contacts 66—66a and the aforementioned spring pulls the contact 66 momentarily away from contact 66a. As this occurs, the capacitor 83 begins to charge up again until a voltage is reached which again energizes the neon lamp. The inertia of the contact 66 carries it back again into contact with contact 66a where it is held in position until the neon lamp becomes extinguished. Thus, while the associated variable is in the pre-alarm range, the neon lamp L–1 flashes on and off. When the variable goes below the pre-alarm limit, the contacts 66—66a do not stick in the closed position when lamp L–1 is extinguished. When the variable is below the pre-alarm range the armature is in a position where the contact 66 cannot reach the contact 66a.

In one exemplary form of the invention, the parameters of the circuit were as follows:

| | |
|---|---|
| Capacitor 83 | 2 microfarads. |
| Resistance 81 | 1 megohm. |
| Resistance 77 | 5100 ohms. |
| Winding 42a | 10 ohms (100 turns). |
| Voltage across buses 69—76 | 0 to 26 volts. |
| Voltage across buses 69—82 | 115 volts. |

The circuit for controlling the alarm lamp L–2 is similar to that previously described. It will therefore not be described, and reference may be had to the previous explanation.

The present invention provides for continuous monitoring of variables for both an adjustable near-alarm condition and an adjustable alarm condition. The circuit is relatively simple, reliable and inexpensive relative to prior circuits heretofore devised for performing similar functions. The automatic reset feature of the pre-alarm lights in a system of a type with which the present invention deals greatly facilitates the use of the common pre-alarm adjusting control in determining quickly and easily the condition of the variables.

It should be understood that numerous modifications may be made of the preferred form of the invention described without deviating from the broader aspects thereof. For example, it is contemplated in the magnetic amplifier circuit of Fig. 1 to omit the relay PTR and in place thereof a neon lamp would be inserted. This would require a special type of magnetic amplifier different from that previously described and would provide a sudden increase in the voltage available to light the neon lamp when a pre-determined differential current condition exists in the control windings. Also, other types of differential circuits can be substituted.

With respect to the terminology used in the claims, the use of such terms as "variable source of current" or similar expressions is intended to cover systems or circuits where current flow is appreciable, or is small and the control is primarily effected through variation in voltage.

I claim:
1. Apparatus for monitoring the condition of a number of variables comprising: an individual alarm detecting circuit for each variable and including a variable-responsive, current-varying means, manually presettable current-varying means for adjusting the alarm limit thereof and means connecting said various means in a circuit where the current flow at a given reference point is dependent upon said variable responsive means and said presettable means, the presettable means being calibrated for the various alarm limits to provide points of adjustment where the current flow in said portion of the circuit will be the same for the various selectable alarm values of the associated variable, a pre-alarm detecting circuit associated with each alarm detecting circuit, a single source of a variable current connected in common with all of said detecting circuits, and including a single manually adjustable control means for simultaneously varying the current in said pre-alarm detecting circuits, said adjustable control means being calibrated in units representing pre-alarm ranges of varying width, and differential current-responsive means associated with each pre-alarm detecting circuit and responsive both to the current flowing at said associated reference point and the current from said variable current source, respective pre-alarm annunciator means associated with said pre-alarm detecting circuits, and respective means for operating each of said pre-alarm annunciator means when the differential current value of said currents flowing in the associated differential current-responsive means reaches a given predetermined value which indicates that the selected pre-alarm range has been reached.

2. Apparatus for monitoring the condition of a number of variables comprising: an individual alarm detecting circuit for each variable and including a variable-responsive, current-varying means, manually presettable current-varying means for adjusting the alarm limit thereof and means connecting said various means in a circuit where the current flow at a given reference point is dependent upon said variable responsive means and said presettable means, the presettable means being calibrated for the various alarm limits to provide points of adjustment where the current flow in said portion of the circuit will be the same for the various selectable alarm values of the associated variable, a pre-alarm detecting circuit associated with each alarm detecting circuit, a source of variable-current including a manually adjustable control for varying the current in said pre-alarm detecting circuits, said adjustable control means being calibrated in units representing pre-alarm ranges of varying width, and differential current-responsive means associated with each pre-alarm detecting circuit and responsive both to the current flowing at said associated reference point and the current from said variable current source, respective pre-alarm annunciator means associated with said pre-alarm detecting circuits, and respective means for operating each of said pre-alarm annunciator means when the differential current value of said currents flowing in the associated differential current-responsive means reaches a given predetermined value which indicates that the selected pre-alarm range has been reached.

3. Apparatus for monitoring the condition of a number of variables comprising: respective alarm detecting means associated with the variables for continuously monitoring the same for alarm conditions, alarm-responsive means associated with and responsive to said detecting means, respective pre-alarm detecting means associated with each variable and each responsive to the presence of a variable whose value is a selected number of units away from an alarm condition, pre-alarm range adjusting means coupled to said pre-alarm detecting means and including a single calibrated manually operable control means common to all of said pre-alarm detecting circuits for simultaneously and progressively adjusting the pre-alarm range at which all of said pre-alarm detecting means will be operated, respective visual annunciator units, means connecting each visual annunciator unit to the associated pre-alarm detecting means for operating the annunciator unit when the associated variable has reached the selected pre-alarm range and including means for providing automatic reset of each annunciator unit as the variable passes out of the selected pre-alarm range.

4. Apparatus for monitoring the condition of a number of variables comprising: respective alarm detecting means associated with the variables for continuously monitoring the same for alarm conditions, alarm-responsive means associated with and responsive to said detecting means, respective pre-alarm detecting means associated with each variable and each responsive to the presence of a variable whose value is a selected number of units away from an alarm condition, pre-alarm range adjusting means coupled to said pre-alarm detecting means and including a calibrated manually operable control means for progressively adjusting the pre-alarm range at which said pre-alarm detecting means will be operated, respective visual annunciator units, means connecting each visual annunciator unit to the associated pre-alarm detecting means for operating the annunciator unit when the associated variable has reached the selected pre-alarm range and including means for providing automatic reset of each annunciator unit as the variable passes out of the selected pre-alarm range.

5. Apparatus for monitoring the condition of a variable comprising: alarm detecting circuit means including a non-linear operating, variable-responsive, current varying means, manually presettable current-varying means for adjusting the alarm limit of the circuit and means connecting said various means in a circuit where the current flow at a given reference point is dependent upon said variable responsive means and said presettable means, the presettable means being calibrated for the various alarm limits to provide points of adjustment where the current flow at said reference point will be the same for the various selectable alarm values of the associated variable, pre-alarm detecting circuit means associated with the alarm detecting circuit and including a source of variable-current including a manually adjustable control for varying the current in said pre-alarm detecting circuit means, said adjustable control means being calibrated in units representing pre-alarm ranges of varying width, and differential current-responsive means responsive both to the current flowing at said reference point and the current from said variable current source, a pre-alarm annunciator means associated with said pre-alarm detecting circuit, means for operating said pre-alarm annunciator means when the relative value of said currents flowing in the associated differential current-responsive means reaches a given predetermined value which indicates that the selected pre-alarm range has been reached, and means ganging together said manually presettable current varying means of said alarm detecting circuit and said manually adjustable control of said pre-alarm detecting circuit for providing the same differential current flow in said differential current-responsive means for the same differential value between the value of the associated variable and any one of the associated selectable alarm limits.

6. Apparatus for monitoring the condition of a variable comprising: alarm detecting circuit means including a variable-responsive, current-varying means and means connecting said means in a circuit where the current flow at a given reference point is dependent upon said variable responsive means, pre-alarm detecting circuit means associated with the alarm detecting circuit and including a source of variable current including presettable control means for varying the current therefrom to vary the pre-alarm setting for the apparatus, and current-responsive means responsive both to the current flowing at said reference point and the current from said variable current source, and a pre-alarm annunciator means associated with said pre-alarm detecting circuit, means for operating said pre-alarm annunciator means when the relative value of said currents flowing in the associated current-responsive means reaches a given predetermined value which indicates that the selected pre-alarm range has been reached.

7. Apparatus for monitoring the condition of a variable comprising: alarm detecting circuit means including a variable-responsive, current-varying means, manually presettable current-varying means for adjusting the alarm limit of the circuit and means connecting said various means in a circuit where the current flow at a given reference point is dependent upon said variable responsive means, pre-alarm detecting circuit means associated with the alarm detecting circuit and including a source of variable-current including a manually adjustable control for varying the current in said pre-alarm detecting circuit, differential current-responsive means responsive both to the current flowing at said reference point and the current from said variable current source, and a pre-alarm annunciator means associated with said pre-alarm detecting circuit, means for operating said pre-alarm annunciator means when the relative value of said currents flowing in the associated differential current-responsive means reaches a given predetermined value which indicates that the selected pre-alarm range has been reached.

8. Apparatus for monitoring the condition of a number of variables comprising: an individual alarm detecting circuit for each variable and including a non-linear operating, variable-responsive, current-varying means, manually presettable current-varying means for adjusting the alarm limit of the circuit and means connecting said various means in a circuit where the current flow in a portion of the circuit is dependent upon said variable responsive means and said presettable means, the presettable means being calibrated for the various alarm limits to provide points of adjustment where the current flow in said portion of the circuit will be the same for the various selectable alarm values of the associated variable, pre-alarm detecting circuit means associated with each alarm detecting circuit and each including a source of variable-current including a manually adjustable control for varying the current in said pre-alarm detecting circuit and differential current-responsive means responsive both to the current flowing in said portion of said alarm detecting circuit and the current from said variable current source, alarm-responsive means, respective means associated with said alarm detecting circuits for operating the alarm-responsive means when said current in said detecting circuit is at an alarm indicating value, respective pre-alarm annunciator means associated with said pre-alarm detecting circuits, respective means for operating each of said pre-alarm annunciator means when the differential current value of said currents flowing in the associated differential current-responsive means reaches a given predetermined value which indicates that the selected pre-alarm range has been reached, compensating means ganging together each manually presettable current varying means of said alarm detecting circuits and said manually adjustable control of the associated pre-alarm detecting circuit for providing the same differential current for the same differential value between the value of the associated variable and any one of the associated selectable alarm limits, a common source of voltage feeding all of said variable current sources of said pre-alarm detecting circuits, and a single control for varying the output of said common source of voltage to simultaneously vary the pre-alarm ranges of all pre-alarm detecting circuits.

9. Apparatus for monitoring the condition of a number of variables comprising: individual electrical alarm detecting means associated with each variable and each including a variable-responsive means for varying a characteristic in the output of said alarm detecting means as a function of the value of the associated variable, a pre-alarm detecting circuit means associated with each alarm detecting means, calibrated manually adjustable means for varying a corresponding characteristic of said pre-alarm detecting circuit to vary the pre-alarm range of operation thereof, means for comparing said characteristics of each associated alarm detecting and pre-alarm detecting means, and annunciator means controlled by said comparing means, the latter operating said annunciator means when the relative values of said characteristics indicates that the selected pre-alarm range has been reached, and alarm-indicating means controlled by said alarm detecting means, the latter operating said alarm-indicating means when said characteristic of the alarm detecting circuit indicates that the variable has reached an alarm value.

10. Apparatus for monitoring the condition of a number of variables comprising: individual electrical alarm detecting means associated with each variable and each including a variable-responsive, current-varying means for varying the current in the output of said alarm detecting means, a pre-alarm detecting circuit means associated wtih each alarm detecting means and including differential current-responsive means responsive both to the current in the output of the associated alarm detecting circuit means and to the current flowing in the associated pre-alarm detecting means, each differential means including a magnetic amplifier having a pair of signal windings wound on a saturable core for varying the permeability of the core and an output winding wound around the core, a source of direct current for a first of said signal windings and means for varying the direct current flowing through said first signal winding for varying the pre-alarm range of operation thereof, the second signal winding being connected to the output of said alarm detecting means, a source of direct current feeding said alarm detecting means, the two signal windings, being differentially connected so that the flux produced in the two signal windings flow in opposite directions in the core, a source of alternating current voltage connected to said output winding, and respective pre-alarm indicating means and connected in circuit with said respective output windings of the magnetic amplifiers, each of said pre-alarm indicating means being arranged to be operated when the current flow in the associated output windings reaches a given predetermined value indicating that the selected pre-alarm range has been reached.

References Cited in the file of this patent

UNITED STATES PATENTS

| | | |
|---|---|---|
| 2,578,447 | Odell et al. | Dec. 11, 1951 |
| 2,728,904 | Schafer | Dec. 27, 1955 |
| 2,756,409 | Lubkin | July 24, 1956 |